United States Patent Office 3,210,348
Patented Oct. 5, 1965

3,210,348
6H - 6 - TRICHLOROMETHYLMERCAPTO - DIBENZO[c,e][1,2]THIAZINE 5,5-DIOXIDE COMPOUNDS
Gerald Rey-Bellet and Hans Spiegelberg, Basel, Switzerland, assignors to Hoffmann-La Roche Inc., Nutley, N.J., a corporation of New Jersey
No Drawing. Filed June 7, 1963, Ser. No. 286,162
Claims priority, application Switzerland, June 26, 1962, 7,697/62; Oct. 12, 1962, 12,008/62
8 Claims. (Cl. 260—243)

This invention relates, in general, to novel diphenyl compounds and to a process for producing same. More particularly, the invention relates to diphenyl compounds having the formula:

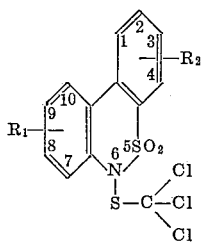

in which the symbol $R_1$ represents hydrogen, a halogen atom or an alkoxy, alkyl or acyl group; and in which $R_2$ represents hydrogen, a halogen atom or an alkoxy, alkyl or acyl group, and to a process for the production of such compounds.

In the most basic embodiment of the invention, the novel compounds of Formula I are prepared by reacting a compound having the following formula:

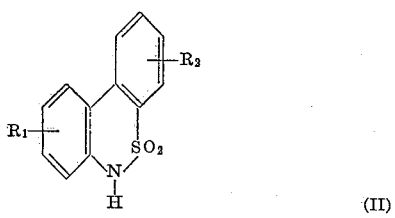

in which the symbols $R_1$ and $R_2$ have the same meanings as set forth heretofore in connection with Formula I or, in the alternative, a metal salt of such compound, with trichloromethylsulphur chloride.

Thus, in the practice of this invention, one can use as the starting material, a compound of Formula II which is unsubstituted in the phenyl nuclei or a metal salt of such compound. In the alternative, the invention may be carried out using, as the starting material, a compound of Formula II, the phenyl nucleus or phenyl nuclei of which is substituted, for example, with halogen atoms such as, chlorine, bromine, etc.; lower aliphatic acyl groups such as, acetyl, formyl, etc.; lower alkyl groups such as, methyl, ethyl, etc.; or lower alkoxy groups such as, methoxy, ethoxy, etc. Additionally, metal salts of such substituted compounds may be used as the starting materials.

The reaction of the compounds of Formula II with trichloromethylsulphur chloride can be carried out by any one of several procedures. Thus, for example, in one such procedure, 6H-dibenzo[c,e][1,2]thiazine 5,5-dioxide in the form of alkali metal salt, for example, the sodium salt, or a derivative thereof appropriately substituted in the phenyl nucleus or phenyl nuclei, is reacted with trichloromethylsulphur chloride, preferably employing stoichiometrically equivalent quantities of the reactants. This reaction takes place, suitably, in the presence of an inert solvent such as, benzene, toluene or carbon tetrachloride, preferably while the reaction mixture is heated at a temperature within the range of from about 50° C. to 130° C.

In another procedure for producing the novel compounds of this invention, a compound of Formula II is dissolved in an aqueous solution containing a stoichiometrically equivalent quantity of an alkali metal hydroxide. The aqueous solution of the alkali metal salt, which is thus obtained, is subsequently reacted with trichloromethylsulphur chloride. In this procedure, the trichloromethylsulphur chloride reactant can, conveniently, be introduced into the reaction mixture in a dropwise manner at a temperature at or near room temperature. As the desired reaction progresses, the desired condensation product of Formula I gradually commences to separate out of the reaction mixture.

A third procedure for producing the compounds of this invention involves the reaction of a compound of Formula II with trichloromethylsulphur chloride in the presence of an acid binding agent. As the acid binding agent in this procedure, one can use, for example, sodium carbonate, potassium carbonate, pyridine or triethylamine.

The novel compounds of Formula I, which are obtained in the practice of this invention, are useful as fungicides and as fungistatic agents. These compounds have utility, for example, in a treatment of infections caused by the organisms Botrytis and Venturia.

For a further understanding of the nature and objects of this invention, reference may be had to the following examples which are given merely as further illustration of the invention and are not to be construed in a limiting sense.

Example 1

In this example, 11.5 g. of sodium were dissolved in 500 ml. of absolute ethanol. To this solution there was added 115.5 g. of 6H-dibenzo[c,e][1,2]thiazine 5,5-dioxide. A clear solution was thus produced and, subsequently, this solution was evaporated to dryness under reduced pressure. The solid residue which remained after the evaporation was complete was suspended in 500 ml. of dry benzene and 93 g. of trichloromethylsulphur chloride were added thereto, drop by drop, over a period of one hour while stirring. The sodium salt gradually disappeared with slight heating. The solution was subsequently boiled at reflux temperature for an additional 5 hour period, following which it was cooled, shaken twice with water, dried and evaporated. The 6H-6-trichloromethylmercapto-dibenzo[c,e][1,2]thiazine 5,5-dioxide, thus obtained, was recrystallized from benzene-petroleum ether to yield the compound melting at 122–123° C.

Example 2

To a solution of 2.3 g. of sodium in 200 ml. of ethyl alcohol, there was added 23.1 g. of 6H-dibenzo[c,e][1,2]thiazine 5,5-dioxide. The clear solution thus formed was treated, in a dropwise fashion, with 18.6 g. of trichloromethylsulphur chloride. The condensation product which was produced precipitated with slight heating. After stirring for 10 hours at room temperature, the precipitate was filtered off under suction and washed with water. Subsequently, the precipitate was dissolved in methylene chloride, the solution shaken with dilute caustic soda, washed with water until neutral, dried over sodium sulphate and evaporated. The residue was recrystallized from benzene-petroleum ether to yield 6H-6-trichloromethylmercapto-dibenzo[c,e][1,2]thiazine 5,5-dioxide, as a yellow crystalline powder, with a melting point at 122°–123° C.

Example 3

To a solution of 1.0 g. of sodium hydroxide in 50 ml. of water, there was added 6.2 g. of 6H-dibenzo[c,e][1,2]thiazine 5,5-dioxide. To the clear solution thus formed there was added, drop by drop, 4.65 g. of trichloromethyl-sulphur chloride. During the addition of the latter reactant, the temperature of the reaction mixture rose to about 30° C. and the condensation product which formed slowly began to separate out. The reaction mixture was stirred for an additional 3 hour period, following which the precipitate which was formed was filtered off under suction, dried and recrystallized from benzene-petroleum ether. There was obtained 6H-6-trichloromethylmercapto-dibenzo[c,e,][1,2]thiazine 5,5-dioxide which after recrystallization from benzene-petroleum ether, melted at 122°–123° C.

*Example 4*

3.1 grams of sodium were dissolved in 100 ml. of absolute alcohol and 35.85 g. of 9-chloro-6H-dibenzo[c,e][1,2]thiazine 5,5-dioxide were added to this solution. A clear solution was thus produced which was evaporated to dryness under reduced pressure. The solid residue which was obtained was suspended in 300 ml. of benzene and 25.2 g. of trichloromethylsulphur chloride were added dropwise thereto with stirring. The sodium salt gradually disappeared with slight heating. The reaction mixture was subsequently heated at reflux temperature for a period of about 5 hours, following which it was cooled, shaken with water, dried and evaporated. These was obtained 9-chloro-6H-6-trichloromethylmercapto-dibenzo [c,e][1,2]thiazine 5,5-dioxide, which after crystallization from benzene-petroleum ether, melted at 159°–160° C.

For completeness of disclosure there is set out in the paragraphs which follow hereinafter, a process for the production of the 9-chloro-6H-dibenzo[c,e][1,2]thiazine 5,5-dioxide which is used as a starting material in this example. It should be fully understood, however, that neither that compound, nor the process for producing same, is part of this invention.

Thus, the starting material, the 9-chloro-6H-dibenzo [c,e][1,2]thiazine 5,5-dioxide, was prepared as follows:

63.75 grams of 4-chloro-aniline were dissolved in 300 ml. of dry pyridine and reacted portionwise with 110.75 g. of 2-nitro-benzenesulphonic acid chloride. Subsequently the reaction mixture was heated at a temperature of 100° C. for 4 hours. The pyridine was evaporated on a steam-bath under reduced pressure, the residue was taken up in methylene chloride and shaken with dilute hydrochloric acid. The condensation product was extracted from the methylene chloride solution with dilute caustic soda and the alkaline solution was filtered over carbon and treated with acetic acid. By this method, 2-nitro-benzenesulphonic acid 4-chloro-anilide precipitated out. After crystallization from dilute alcohol, and recrystallization from benzene-petroleum ether, the compound melted at 124°–125° C.

12.7 grams of the 2-nitro-benzenesulphonic acid 4-chloro-anilide which was produced as described in the preceding paragraph was dissolved in 100 ml. of methanol, and hydrogenated in the presence of 1.3 g. of Raney nickel at room temperature and normal pressure. After filtration from the catalyst, evaporation of the solvent and recrystallization of the residue from benzene-petroleum ether, 2-aminobenzenesulphonic acid 4-chloro-anilide was obtained melting at 118°–120° C.

11.42 grams of the thus obtained 2-amino-benzenesulphonic acid 4-chloro-anilide, 100 ml. of glacial acetic, 39 ml. of concentrated hydrochloric acid and 21 ml. of water were diazotized at a temperature of 20° to 25° C. with a solution of 2.8 g. of sodium nitrite in 30 ml. of water. After the addition of sodium nitrite solution was completed, the mixture was stirred for a period of 15 minutes, following which it was carefully treated with copper powder. When the evolution of nitrogen had ceased, the reaction mixture was stirred for an additional 3 hour period. The precipitate which formed was filtered off under suction, dissolved in dilute caustic soda, filtered from the copper powder and precipitated with acetic acid. By crystallization from ethyl acetate-petroleum ether, 9-chloro-6H-dibenzo[c,e][1,2]thiazine 5,5-dioxide was obtained as crystals melting at 238°–240° C.

*Example 5*

1.85 grams of sodium were dissolved in 80 ml. of absolute ethanol and to this solution there was added 21.4 g. of 2-chloro-6H-dibenzo[c,e][1,2]thiazine 5,5-dioxide. The clear solution, thus obtained, was evaporated to dryness under reduced pressure. The residue was suspended in 200 ml. of benzene and, while stirring, it was treated with 15 g. of trichloromethylsulphur chloride. The reaction mixture was, subsequently, heated at reflux temperature for a period of 4 hours, thereafter cooled, shaken with water, dried and evaporated. The residue, namely, 2-chloro - 6H - 6-trichloromethylmercapto-dibenzo[c,e][1,2]thiazine 5,5-dioxide upon recrystallization from benzene-petroleum ether melted at 140°–142° C.

For completeness of disclosure, there is set out in the paragraphs which follow hereinafter, a process for the production of the 2-chloro-6H-dibenzo[c,e][1,2]thiazine 5,5-dioxide which is used as a starting material in this example. It should be fully understood, however, that neither that compound, nor the process for producing same, is part of this invention.

Thus, the starting material, the 2-chloro-6H-dibenzo-[c,e][1,2]thiazine 5,5-dioxide, was prepared as follows:

46.5 grams of aniline were dissolved in 300 ml. of dry pyridine and treated, portionwise, with 128 g. of 2-nitro-4-chloro-benzenesulphonic acid chloride. Subsequently, the mixture was heated in a bath of 100° C. for a period of 4 hours. The pyridine was evaporated on the steam-bath under reduced pressure, the distillation residue was taken up in methylene chloride and washed with dilute hydrochloric acid. The condensation product was extracted from the methylene chloride solution with dilute caustic soda, the alkaline solution was filtered over carbon and treated with acetic acid. The 2-nitro-4-chloro-benzenesulphonic acid anilide formed as a precipitate. After crystallization from dilute alcohol, and subsequent recrystallization from ethyl acetate-petroleum ether, the compound melted at 130°–132° C.

Thereafter, 48 g. of 2-nitro-4-chloro-benzenesulphonic acid anilide, produced as described in the preceding paragraph, dissolved in 500 ml. of methanol, were hydrogenated in the presence of 10 g. of Raney nickel at room temperature and under normal pressure. After removal of the catalyst by filtration, evaporation of the solvent and recrystallization of the residue from ethyl acetate-petroleum ether, there was obtained 2-amino-4-chloro-benzenesulphonic acid anilide melting at 147°–148° C.

Subsequently, 36.2 g. of 2-amino-4-chloro-benzenesulphonic acid anilide, which was obtained as described in the preceding paragraph, 300 ml. of glacial acetic, 128 ml. of concentrated hydrochloric acid and 65 ml. of water were diazotized with a solution of 8.9 g. of sodium nitrite in 90 ml. of water. After the addition of sodium nitrite had been completed, the mixture was stirred for a period of 15 minutes, diluted with 240 ml. of water and carefully treated with copper powder, whereupon a vigorous evolution of nitrogen occurred. After stirring for 3 hours, the precipitate which formed was filtered off under suction, dissolved in dilute caustic soda, filtered from the copper powder and precipitated with acetic acid. After filtration under suction, washing with water and crystallization from ethyl acetate-petroleum ether, there was obtained the desired 2-chloro-6H-dibenzo[c,e][1,2]thiazine 5,5-dioxide melting at 212°–213° C.

*Example 6*

1.07 grams of sodium were dissolved in 30 ml. of ethanol and to this solution there was added 13.85 g. of 8,9-(9,10)-dichloro-6H-dibenzo[c,e][1,2]thiazine 5,5-dioxide. The clear solution, thus obtained, was evaporated to dryness under reduced pressure, the residue suspended in 100 ml. of benzene and treated, dropwise, with 8.5 g. of trichloromethylsulphur chloride with stirring. After the addition of the trichloromethylsulphur chloride was completed, the mixture was heated at reflux temperature for a period of 5 hours. Thereafter, the reaction mixture was cooled, shaken through twice with water, dried and evaporated. The residue, namely, 8,9-(9,10)-dichloro-6H-6-trichloromethylmercapto - debenzo[c,e][1,2]thiazine 5,5-dioxide, after crystallization from benzene-petroleum ether, melted at 164°–184° C.

For completeness of disclosure, there is set out in the paragraphs which follow hereinafter, a process for the production of the 8,9-(9,10)-dichloro-6H-dibenzo[c,e][1,2]thiazine 5,5-dioxide which is used as a starting material in this example. It should be fully understood, however, that neither that compound, nor the process for producing same, is part of this invention.

Thus, the starting material, the 8,9-(9,10)-dichloro-6H-dibenzo[c,e][1,2]thiazine 5,5-dioxide, was prepared as follows:

81 grams of 3,4-dichloro-aniline were dissolved in 300 ml. of dry pyridine and reacted, portionwise, with 110.75 g. of 2-nitro-benzenesulphonyl chloride. The mixture was heated in a bath at a temperature of 100° for 4 hours. The pyridine was evaporated on the steam-bath under reduced pressure, the distillation residue being taken up subsequently in methylene chloride and washed with dilute hydrochloric acid. The condensation product was extracted from the methylene chloride solution with dilute caustic soda. The alkaline solution was then filtered over animal charcoal and treated with acetic acid, whereupon the 2 - nitro - benzenesulphonic acid 3,4 - dichloro-anilide formed as a precipitate. After crystallization from dilute alcohol, and recrystallization from benzene-petroleum ether, the compound melted at a temperature of 135°–137° C.

Thereafter, 15 g. of 2-nitro-benzenesulphonic acid 3,4-dichloro-anilide, produced as described in the preceding paragraph, dissolved in 100 ml. of methanol, were hydrogenated in the presence of 2.5 g. of Raney nickel at room temperature and under normal pressure. After filtration, evaporation of the solvent and recrystallization of the residue from benzene, there was obtained 2-amino-benzenesulphonic acid 3,4-dichloro-anilide melting at 130°–132° C.

Subsequently, 25.6 g. of the 2-amino-benzenesulphonic acid 3,4-dichloro-anilide, produced as described in the preceding paragraph, 200 ml. of glacial acetic, 78 ml. of concentrated hydrochloric acid and 42 ml. of water were diazotized at a temperature of 15°–20° C. with a solution of 5.6 g. of sodium nitrite in 60 ml. of water. After the addition of sodium nitrite had been completed, the mixture was stirred for 15 minutes and carefully treated, portionwise, with copper powder, whereupon a vigorous evolution of nitrogen occurred. After stirring for a period of 3 to 4 hours, evolution of nitrogen ceased. The precipitate which was formed was filtered off under suction. The precipitate was then dissolved in dilute caustic soda, filtered from the copper powder and precipitated with acetic acid. The product was filtered with suction, washed with a large volume of water and crystallized from ethyl acetate-petroleum ether. There was obtained 8,9-(9,10)-dichloro-6H-dibenzo[c,e][1,2]thiazine 5,5-dioxide melting at 220°–240° C.

*Example 7*

1.88 grams of sodium were dissolved in 50 ml. of absolute ethanol and to this solution there was added 22.4 g. of 9 - epoxy - 6H-dibenzo [c,e][1,2]thiazine 5,5-dioxide. A clear solution was obtained which, subsequently, was evaporated to dryness under reduced pressure. The solid residue which remained was suspended in 150 ml. of dry benzene and 15.15 g. of trichloromethylsulphur chloride were added dropwise with stirring. The sodium salt gradually disappeared with slight heating. The solution was then heated at reflux temperature for a period of 5 hours, following which it was cooled, shaken with water, dried and evaporated. The 9-ethoxy-6H-6-trichloromethylmercapto - dibenzo[c,e][1,2]thiazine 5,5 - dioxide, which was thus obtained, melted, after crystallization from benzene-petroleum ether, at a temperature of 168°–170° C.

For completeness of disclosure, there is set out in the paragraphs which follow hereinafter, a process for the production of the 9-ethoxy-6H-dibenzo[c,e][1,2]thiazine 5,5-dioxide employed as a starting material in this example. However, it should be fully understood that neither that compound, nor the process for its preparation, is part of this invention.

Thus, the 9-ethoxy-6H-dibenzo[c,e][1,2]thiazine 5,5-dioxide, which is employed as the starting material, was produced as follows:

68.5 grams of p-phenetidine were dissolved in 300 ml. of dry pyridine and reacted, portionwise, with 110.75 g. of 2-nitro-benzenesulphonyl chloride. Subsequently, the mixture was heated at a temperature of 100° C. for 4 hours. Pyridine was removed from the reaction mixture by evaporation on the steam-bath under reduced pressure. The residue was taken up in methylene chloride and shaken with dilute hydrochloric acid. The condensation product was extracted from the methylene chloride solution with dilute caustic soda, following which the alkaline solution was filtered over carbon and treated with acetic acid, whereupon 2-nitro-benzenesulphonic acid 4-ethoxy-anilide precipitated out. After crystallization from dilute alcohol and recrystallization from benzene-petroleum ether, the compound melted at 107°–108° C.

15 grams of 2-nitro-benzenesulphonic acid 4-ethoxy-anilide, produced as described in the preceding paragraph, dissolved in 100 ml. of methanol, were hydrogenated in the presence of 3 g. of Raney nickel at room temperature and under normal pressure. After removal of the catalyst by filtration, evaporation of the solvent and recrystallization of the residue from benzene-petroleum ether, 2-amino-benzenesulphonic acid 4 - ethoxy - anilide was obtained melting at 101°–102° C.

21.2 grams of the thus obtained 2-amino-benzenesulphonic acid 4-ethoxy-anilide, 100 ml. of glacial acetic, 78 ml. of concentrated hydrochloric acid and 42 ml. of water were diazotized at at temperature of 20° C. with a solution of 5.6 g. of sodium nitrite in 50 ml. of water. After the addition of sodium nitrite had been completed, the mixture was stirred for a period of 15 minutes and then carefully treated with copper powder. Nitrogen was evolved and the reaction product precipitated out. The mixture was stirred for an additional 3 hour period, following which the precipitate was filtered off under suction. The precipitate was then dissolved in 1 N caustic soda, filtered from the copper powder and precipitated with actic acid. After filtration under suction, washing with a substantial volume of water and crystallization from ethyl acetate-petroleum ether, 9-ethoxy-6H-dibenzo[c,e][1,2]thiazine 5,5-dioxide was obtained melting at 207°–209° C.

*Example 8*

1.6 grams of sodium were dissolved in 50 ml. of absolute ethanol and to this solution there was added 17 g. of 9-methyl-6H-dibenzo[c,e][1,2]thiazine 5,5-dioxide. A clear solution was obtained which was subsequently evaporated to dryness under reduced pressure. The solid residue was suspended in 150 ml. of dry benzene and 12.9 g. of trichloromethylsulphur chloride were added dropwise thereto with stirring. The sodium salt gradually disappeared with slight heating. The solution was subsequently heated at reflux temperature for 5 hours, then cooled, shaken with water, dried and evaporated. The 9 - methyl - 6H-6-trichloromethylmercaptodibenzo-[c,e][1,2]thiazine 5,5-dioxide, which was thus prepared, was recrystallized from benzene-petroleum ether to yield the compound melting at 147°–148° C.

For completeness of disclosure, there is set out in the paragraphs which follow hereinafter, a process for the production of the 9-methyl-6H-dibenzo[c,e][1,2]thiazine 5,5-dioxide starting material used in this example. It should be fully understood, however, that neither that compound, nor the process for its preparation, is part of this invention.

Thus, the 9-methyl-6H-dibenzo[c,e][1,2]thiazine 5,5-dioxide was produced as follows:

53.5 grams of p-toluidine were dissolved in 300 ml. of dry pyridine and reacted, portionwise, with 110.75 g. of 2-nitro-benzenesulphonyl chloride. The mixture was then heated at a temperature of 100° C. for 4 hours. The pyridine was removed from the reaction mixture by evaporation on the steam-bath under reduced pressure, following which the residue was taken up in methylene chloride and shaken with dilute hydrochloric acid. The condensation product was extracted from the methylene chloride solution with dilute caustic soda. The alkaline solution was then filtered over carbon and treated with acetic acid, whereupon 2-nitro-benzenesulphonic acid 4-methyl-anilide formed as a precipitate. After crystallization from dilute alcohol and recrystallization from benzene-petroleum ether, the compound melted at 118°–120° C.

15 grams of 2-nitro-benzenesulphonic acid 4-methyl-anilide, produced as described in the preceding paragraph, dissolved in 100 ml. of methanol, were hydrogenated in the presence of 3 g. of Raney nickel at room temperature and under normal pressure. After removal of the catalyst by filtration, evaporation of the solvent and recrystallization of the residue from benzene-petroleum ether, there was obtained 2-amino-benzenesulphonic acid 4-methyl-anilide melting at 130°–132° C.

45 grams of 2-amino-benzenesulphonic acid 4-methyl-anilide, 200 ml. of glacial acetic, 160 ml. of concentrated hydrochloric acid and 86 ml. of water were diazotized at 20° C. with a solution of 11.5 g. of sodium nitrite in 125 ml. of water. After the addition of sodium nitrite had been completed, the mixture was stirred for a period of 20 minutes, following which it was diluted with 300 ml. of water and carefully treated with copper powder. When evolution of nitrogen from the reaction mixture had ceased, the mixture was stirred for a period of 3 hours. The precipitate was then recovered by filtration with suction, washed with water and dissolved in 1 N caustic soda. The solution was filtered to remove the copper powder therefrom and the desired compound was precipitated from solution by addition of acetic acid. There was obtained, by crystallization of the precipitate from ethyl acetate-petroleum ether, 9-methyl-6H-dibenzo-[c,e][1,2]thiazine 5,5-dioxide in the form of colourless crystals melting at 223°–225° C.

*Example 9*

0.65 gram of sodium was dissolved in 20 ml. of ethanol and to this solution there was added 7.4 g. of 9-acetyl-6H-dibenzo[c,e][1,2]thiazine 5,5-dioxide. A clear solution was obtained which was evaporated to dryness under reduced pressure. The solid residue, which remained after the removal of the solvent, was suspended in 100 ml. of dry benzene and 5.05 g. of trichloromethylsulphur chloride were added dropwise thereto. The sodium salt disappeared gradually with moderate heating. The solution was heated at reflux temperature for a period of 5 hours, following which it was cooled, shaken with water, dried and evaporated. The desired 9-acetyl-6H-6-trichloromethylmercapto - dibenzo[c,e][1,2]thiazine 5,5-dioxide which separated was crystallized from benzene-petroleum ether. The crystallized product melted at 185°–187° C.

For completeness of disclosure, there is set out in the paragraphs which follow hereinafter, a process for the production of 9-acetyl-6H-dibenzo[c,e][1,2]thiazine 5,5-dioxide which is used as a starting material in this example. It should be fully understood, however, that neither that compound, nor the process for its preparation, is part of this invention.

Thus, the starting material, the 9-acetyl-6H-dibenzo-[c,e][1,2]thiazine 5,5-dioxide, was produced as follows:

42.9 grams of 4-amino-acetophenone were dissolved in 190 ml. of dry pyridine and treated, portionwise, with 70.5 g. of 2-nitro-benzenesulphonyl chloride. The mixture was heated at a temperature of 100° C. for a period of 4 hours. The pyridine was subsequently removed from the reaction mixture by evaporation under reduced pressure. The residue was then taken up in methylene chloride and shaken with dilute hydrochloric acid. The condensation product was extracted from the methylene chloride solution with dilute caustic soda, following which the alkaline solution was filtered over carbon and treated with acetic acid, whereupon 2-nitro-benzenesulphonic acid 4-acetyl-anilide formed as a precipitate. The compound, after crystallization from acetone-water, melted at a temperature of 221°–223° C.

48.4 grams of 2-nitro-benzenesulphonic acid 4-acetyl-anilide, produced as described in the preceding paragraph, dissolved in 480 ml. of methanol, was hydrogenated in the presence of 12 g. of Raney nickel at room temperature and under normal pressure. After removal of the catalyst by filtration, evaporation of the solvent and recrystallization of the residue from benzene-petroleum ether, 2-amino-benzenesulphonic acid 4-acetyl-anilide was obtained melting at 173°–174° C.

29 grams of the thus obtained 2-amino-benzenesulphonic acid 4-acetyl-anilide, 140 ml. of glacial acetic, 107 ml. of concentrated hydrochloric acid and 58 ml. of water were diazotized at a temperature of 20° to 25° C. with a solution of 7.72 g. of sodium nitrite in 85 ml. of water. After the addition of sodium nitrite had been completed, the mixture was stirred for a period of 15 minutes, diluted with 220 ml. of water and carefully treated with copper powder. When evolution of nitrogen from the reaction mixture ceased, the mixture was stirred for a period of 3 hours. The precipitate, which formed, was recovered by filtration with suction, washed with water and dissolved in caustic soda. The solution, thus obtained, was filtered to remove the copper powder and the desired product was precipitated from solution by the addition of acetic acid. Crystallization of the product from ethyl acetate-petroleum ether yielded 9-acetyl-6H-dibenzo[c,e][1,2]thiazine 5,5-dioxide melting at 321°–323° C.

We claim:

1. A compound of the formula

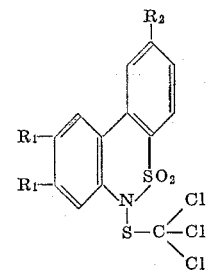

in which $R_1$ is a member selected from the group consisting of hydrogen, chlorine, bromine, lower alkoxy, lower alkyl and lower aliphatic acyl; and in which $R_2$ is a member selected from the group consisting of hydrogen, chlorine and bromine.

2. 6H - 6 - trichloromethylmercapto - dibenzo[c,e][1,2]thiazine 5,5-dioxide.

3. 9 - chloro - 6H - 6 - trichloromethylmercapto-dibenzo[c,e][1,2]thiazine 5,5-dioxide.

4. 2 - chloro - 6H - 6 - trichloromethylmercapto - dibenzo[c,e][1,2]thiazine 5,5-dioxide.

5. 8,9 - (9,10) - dichloro - 6H - 6 - trichloromethylmercapto-dibenzo[c,e][1,2]thiazine 5,5-dioxide.

6. 9 - ethoxy - 6H - 6 - trichloromethylmercapto-dibenzo[c,e][1,2]thiazine 5,5-dioxide.

7. 9 - methyl - 6H - 6 - trichloromethylmercapto-dibenzo[c,e][1,2]thiazine 5,5-dioxide.

8. 9 - acetyl - 6H - 6 - trichloromethylmercapto- - dibenzo[c,e][1,2]thiazine 5,5-dioxide.

References Cited by the Examiner

FOREIGN PATENTS 592,322  2/60  Canada.

OTHER REFERENCES

Kittleson: "Science," vol. 115, pages 84–6 (1952).

WALTER A. MODANCE, *Primary Examiner.*

NICHOLAS S. RIZZO, *Examiner.*

UNITED STATES PATENT OFFICE
CERTIFICATE OF CORRECTION

Patent No. 3,210,348                            October 5, 1965

Gerald Rey-Bellet et al.

It is hereby certified that error appears in the above numbered patent requiring correction and that the said Letters Patent should read as corrected below.

Column 3, line 26, for "These" read -- There --; line 51, for "crystallation" read -- crystallization --; column 5, line 8, for "-debenzo" read -- -dibenzo --; line 68, for "9-epoxy-" read -- 9-ethoxy- --; column 6, line 54, for "actic" read -- acetic --.

Signed and sealed this 23rd day of August 1966.

(SEAL)
Attest:

ERNEST W. SWIDER                                    EDWARD J. BRENNER
Attesting Officer                                          Commissioner of Patents